US011403802B2

(12) United States Patent
Risser

(10) Patent No.: US 11,403,802 B2
(45) Date of Patent: Aug. 2, 2022

(54) METHODS AND SYSTEMS FOR OPTIMAL TRANSPORT OF NON-LINEAR TRANSFORMATIONS

(71) Applicant: Unity IPR ApS, Copenhagen (DK)

(72) Inventor: Eric Andrew Risser, Dublin (IE)

(73) Assignee: Unity IPR ApS, Copenhagen (DK)

(*) Notice: Subject to any disclaimer, the term of this patent is extended or adjusted under 35 U.S.C. 154(b) by 0 days.

(21) Appl. No.: 17/339,639

(22) Filed: Jun. 4, 2021

(65) Prior Publication Data

US 2021/0383589 A1    Dec. 9, 2021

Related U.S. Application Data

(60) Provisional application No. 63/104,356, filed on Oct. 22, 2020, provisional application No. 63/035,585, filed on Jun. 5, 2020.

(51) Int. Cl.
*G06T 15/00* (2011.01)
*G06N 3/04* (2006.01)

(52) U.S. Cl.
CPC ........... *G06T 15/00* (2013.01); *G06N 3/0454* (2013.01); *G06N 3/0481* (2013.01)

(58) Field of Classification Search
CPC ..... G06T 15/00; G06N 3/0454; G06N 4/0481
USPC ....................................................... 345/418
See application file for complete search history.

(56) References Cited

U.S. PATENT DOCUMENTS

2018/0158224 A1* 6/2018 Bethge ................. G06V 30/194
2020/0296358 A1* 9/2020 Min ........................... G06T 5/20

FOREIGN PATENT DOCUMENTS

WO    2021245278    12/2021

OTHER PUBLICATIONS

Nicholas Kolkin, "Style Transfer by Relaxed Optimal Transport and Self-Similarity" (Year 2019), arXiv, arXiv:1994.12785v2cs.CV, (Oct. 9, 2019), 12 pages, (applicant provides this NPL reference in IDS).*

(Continued)

*Primary Examiner* — Hai Tao Sun
(74) *Attorney, Agent, or Firm* — Schwegman Lundberg & Woessner, P.A.

(57) ABSTRACT

Herein is presented a light-weight, high-quality texture synthesis algorithm that generalizes to other applications. We utilize an optimal transport optimization process within a bottleneck layer of an auto-encoder, achieving quality and flexibility on par with expensive back-propagation based neural texture synthesis methods, but at interactive rates. In addition to superior synthesis quality, our statistically motivated approach generalizes better to other special case texture synthesis problems such as Style Transfer, Inverse-Texture Synthesis, Texture Mixing, Multi-Scale Texture Synthesis, Structured Image Hybrids and Texture Painting. We treat the texture synthesis problem as the optimal transport between Probably Density Function of the deep neural activation vectors of the image being synthesized and the exemplar texture. We present a fast algorithm that matches random sliced 1-Dimensional histograms projected from the full N-Dimensional distribution and we propose an extension of this algorithm that reduces dimensionality of neural feature space.

20 Claims, 9 Drawing Sheets

(56) References Cited

OTHER PUBLICATIONS

Ulyanov, Dmitry, "Texture Networks: Feed-forward Synthesis of Textures and Stylized Images", arXiv preprint, arXiv:1 603.03417v1 [cs.CV], (Mar. 10, 2016), 16 pgs.
Ustyuzhaninov, Ivan, "Texture Synthesis Using Shallow Convolutional Networks with Random Filters", arXiv preprint, arXiv:1606.00021v1 [cs.CV], (May 31, 2016), 9 pgs.
Wang, Xin, "Multimodal Transfer: A Hierarchical Deep Convolutional Neural Network for Fast Artistic Style Transfer", arXiv preprint, arXiv:1612.01895v2 [cs.CV], (Apr. 11, 2017), 9 pgs.
Wang, Zi-Ming, "Texture Mixing by Interpolating Deep Statistics via Gaussian Models", arXiv preprint, arXiv:1807.11035v1 [cs.CV], (Jul. 29, 2018), 17 pgs.
Wei, Li-Yi, "Fast Texture Synthesis using Tree-structured Vector Quantization", Stanford University, Proceedings of SIGGRAPH 2000, (2000), 10 pgs.
Wei, Li-Yi, "Inverse Texture Synthesis", author preprint, ACM SIGGRAPH '08, (2008), 14 pgs.
Yan, Zhicheng, "Automatic Photo Adjustment Using Deep Neural Networks", arXiv preprint, arXiv:1412.7725v2 [cs.CV], (May 16, 2015), 15 pgs.
Yang, Chao, "High-Resolution Image Inpainting using Multi-Scale Neural Patch Synthesis", arXiv preprint, arXiv:1611.09969v2 [cs.CV], (Apr. 13, 2017), 9 pgs.
Yu, Ning, "Texture Mixer: A Network for Controllable Synthesis and Interpolation of Texture", arXiv preprint, arXiv:1901.03447v2 [cs.CV], (Apr. 16, 2019), 22 pgs.
Zhu, Jun-Yan, "Generative Visual Manipulation on the Natural Image Manifold", arXiv preprint, arXiv:1609.03552v3 [cs.CV], (Dec. 16, 2018), 16 pgs.
"International Application Serial No. PCT EP2021 065072, International Search Report dated Sep. 13, 2021", 5 pages.
"International Application Serial No. PCT EP2021 065072, Written Opinion dated Sep. 13, 2021", 6 pages.
Mroueh, Youssef, "Wasserstein Style Transfer", arxiv.org Cornell University Library, 201 Olin Library Cornell University Ithaca, NY 14853, (May 30, 2019), 25 pages.
Nicholas, Kolkin, "Style Transfer by Relaxed Optimal Transport and Self-Similarity", 2019 IEEE CVF Conference on Computer Vision and Pattern Recognition (CVPR), IEEE, (Jun. 15, 2019), pp. 10043-10052.
Aittala, Muka, "Reflectance Modeling by Neural Texture Synthesis", author preprint, ACM Transactions on Graphics (Proc. SIGGRAPH 2016), (2016), 13 pgs.
Barnes, Connelly, "PatchMatch: A Randomized Correspondence Algorithm for Structural Image Editing", author preprint, ACM SIGGRAPH '09, (2009), 10 pgs.
Barnes, Connelly, "PatchTable: Efficient Patch Queries for Large Datasets and Applications", author preprint, ACM Transactions on Graphics, 34(4):97, (2015), 10 pgs.
Berger, Guillaume, "Incorporating Long-Range Consistency in CNN-Based Texture Generation", arXiv preprint, arXiv:1606.01286v2 [cs CV], (Nov. 5, 2016).
Burt, Peter J, "The Laplacian Pyramid as a Compact Image Code", IEEE Transactions on Communications, vol. Com-31, No. 4, (Apr. 1983), 532-540.
Chang, Huiwen, "Automatic Triage for a Photo Series", ACM SIGGRAPH 16 Technical Paper, Anaheim, CA, (Jul. 2016), 10 pages.
Chen, Tian Qi, "Fast Patch-based Style Transfer of Arbitrary Style", arXiv preprint, arXiv:1612.04337v1 [cs.CV], (Dec. 13, 2016), 10 pgs.
Darabi, Soheil, "Image Melding: Combining Inconsistent Images using Patch-based Synthesis", author preprint, ACM Transactions on Graphics, 31(4):82, (Jul. 2012), 10 pgs.
Diamanti, Olga, "Synthesis of Complex Image Appearance from Limited Exemplars", ACM Transactions on Graphics, 34(2):22, (Feb. 2015), 13 pgs.

Efros, Alexei A, "Image Quilting for Texture Synthesis and Transfer", author preprint, SIGGRAPH '01, (Aug. 2001), 6 pgs.
Efros, Alexei A, "Texture Synthesis by Non-parametric Sampling", IEEE International Conference on Computer Vision, Corfu, Greece, (Sep. 1999), 6 pgs.
Fiser, Jakub, "StyLit Illumination-Guided Example Based Stylization of 3D Renderings", ACM SIGGRAPH 16 Technical Paper, Anaheim, CA, (Jul. 2016).
Gatys, Leon A, "Controlling Perceptual Factors in Neural Style Transfer", arXiv preprint, arXiv:1611.07865v2 [cs.CV], (May 11, 2017), 9 pgs.
Gatys, Leon A, "Image Style Transfer Using Convolutional Neural Networks", Proceedings of the IEEE Conference on Computer Vision and Pattern Recognition (CVPR), (2016), 2414-2423.
Gatys, Leon A, "Preserving Color in Neural Artistic Style Transfer", arXiv preprint, arXiv: 1606.05897v1 [cs.CV], (Jun. 19, 2016), 8 pgs.
Gatys, Leon A, "Texture Synthesis Using Convolutional Neural Networks", arXiv preprint, arXiv:1505.07376v3 [cs.CV], (Nov. 6, 2015), 10 pgs.
Hacohen, Yoav, "Non-rigid dense correspondence with applications for image enhancement", ACM Transactions on Graphics, 30(4): 70, (Jul. 2011), 10 pgs.
He, Kaiming, "Deep Residual Learning for Image Recognition", arXiv preprint, arXiv: 1512.03385v1 [cs.CV], (Dec. 10, 2015), 12 pgs.
Heeger, David J, "Pyramid-Based Texture Analysis Synthesis", author preprint, SIGGRAPH '95, (1995), 10 pgs.
Hertzmann, Aaron, "Image Analogies", author preprint, SIGGRAPH '01, (Aug. 2001), 14 pgs.
Ioffe, Sergey, "Batch Normalization: Accelerating Deep Network Training by Reducing Internal Covariate Shift", arXiv preprint, arXiv:1502.03167v3 [cs.LG], (Mar. 2, 2015), 11 pgs.
Johnson, Justin, "Perceptual Losses for Real-Time Style Transfer and Super-Resolution", arXiv preprint, arXiv:1603.08155v1, (Mar. 27, 2016), 18 pgs.
Julien, Rabin, "Wasserstein Barycenter and its Application to Texture Mixing", SSVM11, 2011, Israel hal 00476064, (Apr. 23, 2010), 16 pages.
Kalantari, Nima Khademi, "Learning-Based View Synthesis for Light Field Cameras", author preprint, ACM SA 16 Technical Papers, Macao, (Dec. 2016), 10 pages.
Kolkin, Nicholas, "Style Transfer by Relaxed Optimal Transport and Self-Similarity", arXiv, arXiv:1904.12785v2 [cs.CV], (Oct. 9, 2019), 12 pgs.
Krizhevsky, Alex, "ImageNet Classification with Deep Convolutional Neural Networks", author preprint, Advances in Neural Information Processing Systems 25 (NIPS 2012), 1097-1105, (2012), 9 pgs.
Kwatra, Vivek, "Graphcut Textures: Image and Video Synthesis Using Graph Cuts", author preprint, ACM SIGGRAPH 2003, (2003), 10 pgs.
Kwatra, Vivek, "Texture Optimization for Example-based Synthesis", author preprint, ACM SIGGRAPH '05, (2005), 8 pgs.
Lefebvre, Sylvain, "Appearance-Space Texture Synthesis", Microsoft Research, (2006), 8 pgs.
Lefebvre, Sylvain, "Parallel Controllable Texture Synthesis", author preprint, ACM SIGGRAPH '05, (2005), 10 pgs.
Li, Chuan, "Combining Markov Random Fields and Convolutional Neural Networks for Image Synthesis", arXiv preprint, arXiv:1601.04589v1 [cs.CV], (Jan. 18, 2016), 9 pgs.
Li, Yijun, "Diversified Texture Synthesis with Feed-forward Networks", arXiv preprint, arXiv:1703.01664v1 [cs.CV], (Mar. 5, 2017), 11 pgs.
Li, Yijun, "Universal Style Transfer via Feature Transforms", arXiv preprint, arXiv:1705.08086v2 [cs.CV], (Nov. 17, 2017), 11 pgs.
Lu, Ming, "A Closed-form Solution to Universal Style Transfer", arXiv preprint, arXiv:1906.00668v2 [cs.CV], (Aug. 14, 2019), 10 pgs.
Lukac, M, "Brushables: Example-based Edge-aware Directional Texture Painting", Pacific Graphics, 34(7), Wiley, (2015), 11 pgs.
Lukac, Michal, "Painting by Feature: Texture Boundaries for Example-based Image Creation", author preprint, ACM Transactions on Graphics, 32(4):116, (Jul. 2013), 8 pgs.

(56) References Cited

OTHER PUBLICATIONS

Mahendran, Aravindh, "Understanding Deep Image Representations by Inverting Them", arXiv preprint, arXiv:1412.0035v1 [cs.CV], (Nov. 26, 2014), 9 pgs.

Mordvintsev, Alexander, "Inceptionism: Going Deeper into Neural Networks", Google AI Blog, [Online] Retrieved from the Internet: URL: https: ai.googleblog.com Jun. 2015 inceptionism-going-deeper-into-neural.html [Retrieved on Apr. 7, 2021], (Jun. 17, 2015), 6 pgs.

Olszewski, Kyle, "High-Fidelity Facial and Speech Animation for VR HMDs", author preprint, ACM Transactions on Graphics (TOG), 35(6), (2016), 14 pgs.

Pathak, Deepak, "Context Encoders: Feature Learning by Inpainting", arXiv preprint, arXiv:1604.07379v2 [cs.CV], (Nov. 12, 2016), 12 pgs.

Pitie, F, "Automated Colour Grading using Colour Distribution Transfer", author preprint, Elsevier, (Feb. 22, 2007), 31 pgs.

Portilla, Javier, "A Parametric Texture Model Based on Joint Statistics of Complex Wavelet Coefficients", International Journal of Computer Vision, 40(1), 49-71, Kluwer, NL, (2000), 23 pgs.

Risser, Eric, "Stable and Controllable Neural Texture Synthesis and Style Transfer Using Histogram Losses", arXiv preprint, arXiv:1701.08893v2 [cs.GR], (Feb. 1, 2017), 14 pgs.

Ritter, Lincoln, "Painting With Texture", Eurographics Symposium on Rendering, (2006), 8 pgs.

Selim, Ahmed, "Painting Style Transfer for Head Portraits using Convolutional Neural Networks", ACM Trans. Graph 35(4): 129, (Jul. 2016), 18 pgs.

Sendik, Omry, "Deep Correlations for Texture synthesis", author preprint, ACM Transactions on Graphics, (Apr. 2017), 15 pgs.

Siddiqui, Hasib, "Hierarchical Color Correction for Camera Cell Phone Images", author preprint, IEEE Transactions on Image Processing, 17(11), 2138-2155, (2008), 33 pgs.

Simonyan, Karen, "Very Deep Convolutional Networks for Large-Scale Image Recognition", arXiv preprint, arXiv:1409.1556v6 [cs.CV], (Apr. 10, 2015), 14 pgs.

Tsai, Yi-Hsuan, "Sky is Not the Limit: Semantic Aware Sky Replacement", SIGGRAPH 16 Technical Paper, Anaheim, CA, (Jul. 2016), 11 pages.

Ulyanov, Dmitry, "Instance Normalization: The Missing Ingredient for Fast Stylization", arXiv preprint, arXiv:1607.08022v3 [cs.CV], (Nov. 6, 2017), 6 pgs.

\* cited by examiner

METHODS AND SYSTEMS FOR OPTIMAL TRANSPORT OF NON-LINEAR TRANSFORMATIONS

CROSS-REFERENCE TO RELATED APPLICATIONS

This application claims the benefit of U.S. Provisional Application No. 63/035,585, filed Jun. 5, 2020, entitled "METHOD AND SYSTEM FOR OPTIMAL TRANSPORT OF NONLINEAR TRANSFORMATIONS," and U.S. Provisional Application No. 63/104,356, filed Oct. 22, 2020, entitled "OPTIMAL TRANSPORT OF NON-LINEAR TRANSFORMATIONS," each of which is incorporated by reference herein in its entirety.

TECHNICAL FIELD

The subject matter disclosed herein generally relates to the technical field of computer graphics rendering with computer systems, and in one specific example, to computer systems and methods for synthesizing textures using a texture optimization process.

BACKGROUND OF THE INVENTION

Methods for both representing and synthesizing textures have been explored over the last decades. Texturing has been represented using only first-order feature statistics gathered through convolution of an image with a filter-bank and utilized an optimization process to transform a noise image into one that statistically matches an exemplar. This strategy was expanded upon with sophisticated filters and joint Nth-order statistics of the filter responses, averaged across an image into a parametric model.

Patch-based methods represent texture as a collection of overlapping image patches and various corresponding synthesis methods attempt to re-arrange a configuration of the patches and blend overlapping regions so that a resulting image shares similar patch statistics with an exemplar.

Deep Learning based algorithms have achieved results on classically difficult special cases of texture synthesis, predominantly Style Transfer. A work on neural texture synthesis and style transfer [Gatys et al. 2015 "Texture synthesis using convolutional neural networks"; Gatys et al. 2016 "2016. Image style transfer using convolutional neural networks"], introduced both supervised and deep learning to the field, advancing quality of textures synthesized from a parametric model. Gatys builds upon an image synthesis strategy first used for visualizing the training process within a CNN and later extended by Deep Dream to produce artistic work. The work uses a collection of Gram matrices gathered from several key layers of a neural network, cumulatively as the parametric model for texture, where transforming an image to mimic the texture of another is achieved through minimizing the distance between each image's respective set of Gram matrices. Since the introduction of the concept, it is common practice to numerically measure the visual similarity of two textures as the distance between their corresponding averaged co-occurrence matrices. Several techniques have been developed to improve synthesis quality. An instability inherent to the Gram matrix based parametric model was highlighted and the loss function was supplemented with an additional histogram matching term, similar to the first order statistics matching approach. A coarse-to-fine multi-scale pyramid approach was introduced for the synthesis process which yielded both speed and quality improvements. Many other contemporary extensions to the basic Gatys approach were proposed to extend its functionality for related image synthesis tasks such as regular pattern synthesis and Texture Painting.

A major drawback of the Gatys et al. method is a high cost of utilizing back-propagation training as a general purpose optimizer for texture synthesis. To address this, several feed-forward network training schemes have been explored to approximate the optimization process, formulating the problem as one of learning texture synthesis as an image-to-image translation problem. While fast, these inference methods are comparatively weaker with respect to visual quality and they require training one network for one or a small number of styles. Thus, much of the research in this area has been focused on improving visual quality and arbitrary texture support.

The first truly universal style transfer method, that did not require custom training for each style, was introduced by Chen and Schmidt "Fast patch-based style transfer of arbitrary style" who present an auto-encoder strategy that mimics the original back-propagation strategy of Gatys et al. by using pre-trained VGG as the encoder and then they train an inversion network as the decoder. This strategy was expanded upon by others introducing decoders after each pooling layer of VGG and a deep-to-shallow iterative synthesis strategy, more closely mimicking the original Gatys approach that matches a set of layers for each pooling size. Others have recently combined neural network models with non-parametric patch-based models.

BRIEF DESCRIPTION OF THE DRAWINGS

Features and advantages of example embodiments of the present disclosure will become apparent from the following detailed description, taken in combination with the appended drawings, in which.

DETAILED DESCRIPTION

Figure 1A:
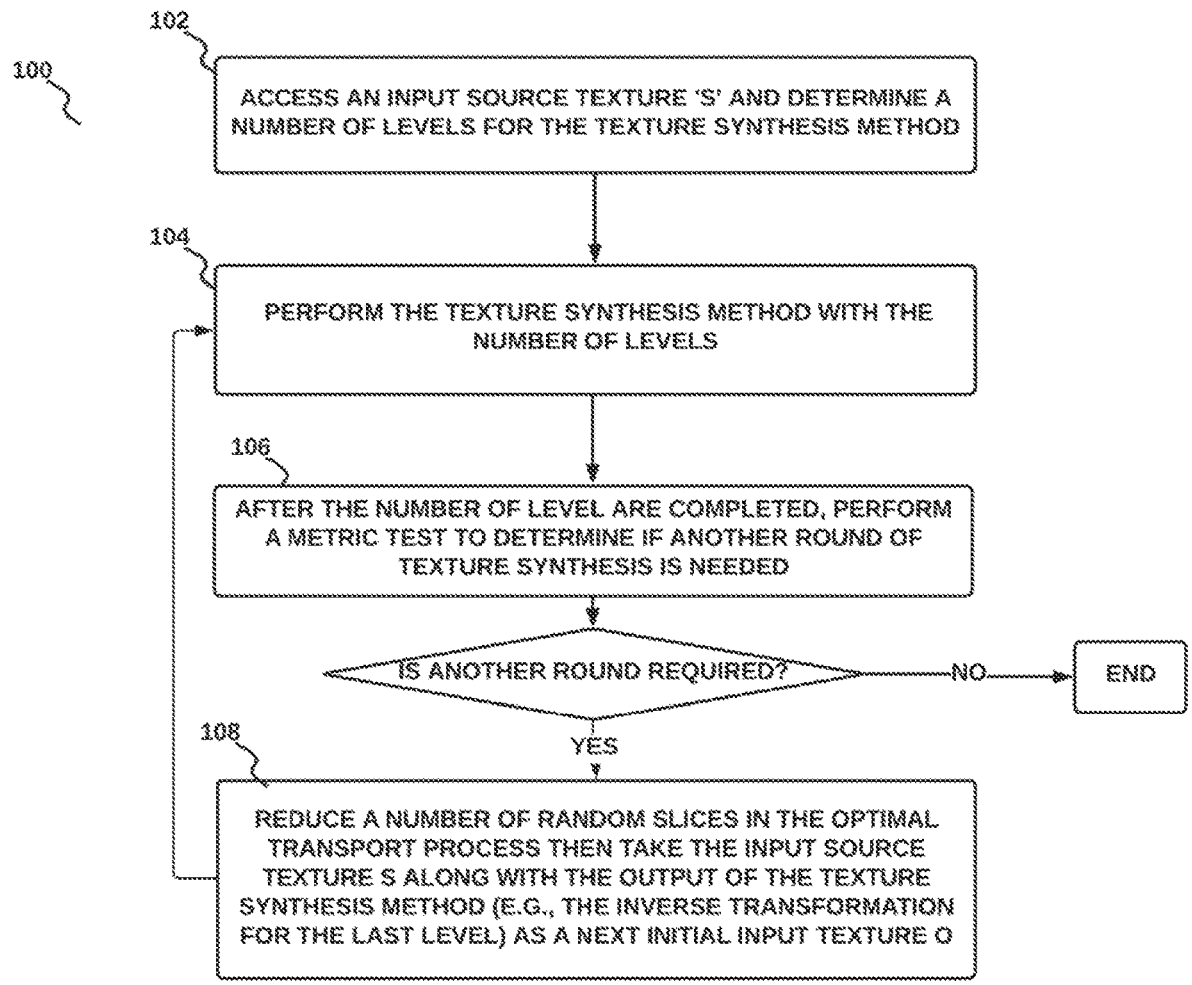
FIG. 1A is a schematic illustrating a method for texture synthesis, in accordance with an embodiment.

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that various embodiments of the inventive subject matter may be practiced without these specific details.

The term 'content' used throughout the description herein should be understood to include all forms of media content items, including images, videos, audio, text, 3D models (e.g., including textures, materials, meshes, and more), animations, vector graphics, and the like.

Methods for both representing and synthesizing textures have been explored broadly, including utilizing neural networks, both as a way to represent texture features as well as a mechanism for performing the synthesis. The systems and methods described herein disclose a statistically motivated formulation of the Texture Synthesis problem (e.g., representation and synthesis of textures) including robust feature transformation through optimal transport, with contributions over the state of the art in neural texture synthesis in at least two areas: performance and generalization.

Performance improvements include both visual quality as well as speed of computation. The systems and methods described herein achieve the performance improvements using an N-Dimensional probability density function transform operating directly on deep neural features (e.g., extracted by a neural network), within a bottleneck layer of an auto-encoder. This achieves quality and flexibility similar to expensive back-propagation based methods, but within an auto-encoder framework (e.g., as described below with respect to FIG. 1A, FIG. 1B, FIG. 1C, FIG. 2, FIG. 3, FIG. 4, and FIG. 5) that does not require custom training. In addition, within the framework, an N-Dimensional PDF transform is accelerated through dimension reduction.

The improvement in generalization includes an increased flexibility of the systems and methods described herein (e.g., when compared to existing systems and methods), whereby the systems and methods may be applied to additional texture synthesis problems including. Style Transfer, Inverse-Texture Synthesis, Texture Mixing, Multi-scale Texture Synthesis, Structured Image Hybrids and Texture Painting (e.g., as described below). These difficult additional problems have historically required significant modifications to popular texture synthesis methods, or justified their own custom tailored approach. The systems and methods described herein directly applies to the texture synthesis problem and can solve the additional special cases either directly or with minor modifications. Overall, the speed, quality and generalization of the systems and methods described herein provide a "Swiss army knife" solution for texture synthesis problems, suitable for deployment within an artistic tool. In addition, a histogram hashing method a user (e.g., a human artist) may directly guide the synthesis, creating an interactive artistic tool. The histogram hashing method has further application for spatial texture mixing as well as multiscale texture synthesis based on exemplar graphs.

The systems and methods described herein include one or more components or operations that are non-routine or unconventional individually or when combined with one or more additional components or operations, because, for example, they provide a number of valuable benefits that include: a fast, high quality neural texture synthesis based on robust feature matching of first order statistics; an acceleration strategy making this approach interactive, including for high resolution images; extensions to several special case problems such as Style Transfer, Inverse-Texture Synthesis, Texture Mixing, Multi-scale Texture Synthesis, Structured Image Hybrids and Texture Painting (e.g., as described below); and hierarchical histograms that provide a user control scheme, based on feature re-sampling through guide maps (e.g., as described below).

A method of converting a set of first order statistics into an image space is disclosed. Data describing an input source texture and an initial input texture is accessed. The input source texture and the initial input texture are transformed into respective feature representations of each input. The transforming includes using a first nonlinear transformation process. An optimal transport process is applied to the respective feature representations. The optimal transport process modifies the set of first order statistics. The set of first order statistics belongs to the initial input texture feature representation. The modifying includes performing a matching of the set of first order statistics to a second set of first order statistics. The second set of first order statistics belongs to the input source texture feature representation. The modified set of first order statistics is passed to a second nonlinear transform to perform the converting of the modified set of first order statistics into the image space.

Motivation

A goal of texture synthesis is, given an exemplar image, to construct a generative process that can synthesize a plurality of new unique images that are indistinguishable from the exemplar. Textures can be modeled as a finite set of statistical measurements taken over a spatial extent of a theoretically infinite image. Any sub-infinite image with the same statistical measurements can be considered the same texture. Modeling texture in such a way conveniently provides many mathematical tools to analytically measure a similarity between two textures.

The study of texture synthesis can be broadly summarized as having two goals: (1) finding better representations for texture that more directly model key feature statistics and (2) finding better generative processes for synthesizing new images that match to a set of exemplar feature statistics. These two goals may be symbiotic, a stronger representation can compensate for a weaker generative process and vice versa.

Existing non-linear-filter based neural network methods can be grouped into two broad categories: optimization and inference. Each category can be characterized by shortcomings with respect to either speed, output quality or an ability to generalize to multiple textures. The systems and methods described herein include a hybrid optimization and inference neural network that provides benefits of both the optimization and inference categories while avoiding their shortcomings. The systems and methods include a robust optimization process that matches feature statistics, but wherein the optimization process works deep within a feature space of the neural network (e.g., as opposed to working in an image space). Accordingly, a neural network transform may be configured to transform deep neural network activation values directly in order to avoid considerable computational overhead when running the neural network in each optimization pass, making gains per iteration to reduce an overall number of steps.

The systems and methods described herein combine a computationally efficient representation with a robust and computationally efficient generative process.

Figure 1B:
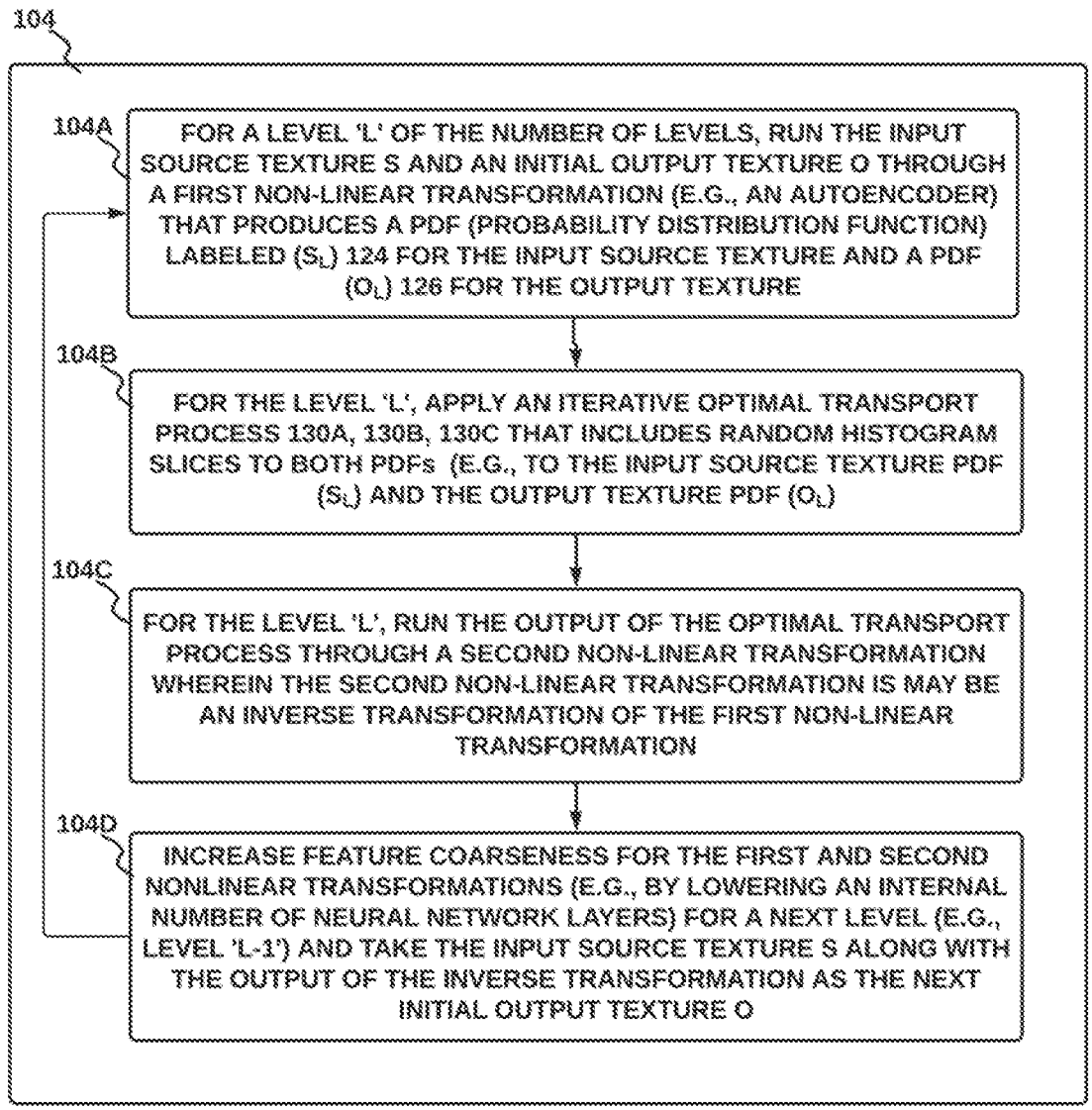
FIG. 1B is a schematic illustrating a method for texture synthesis, in accordance with an embodiment.
Figure 1C:
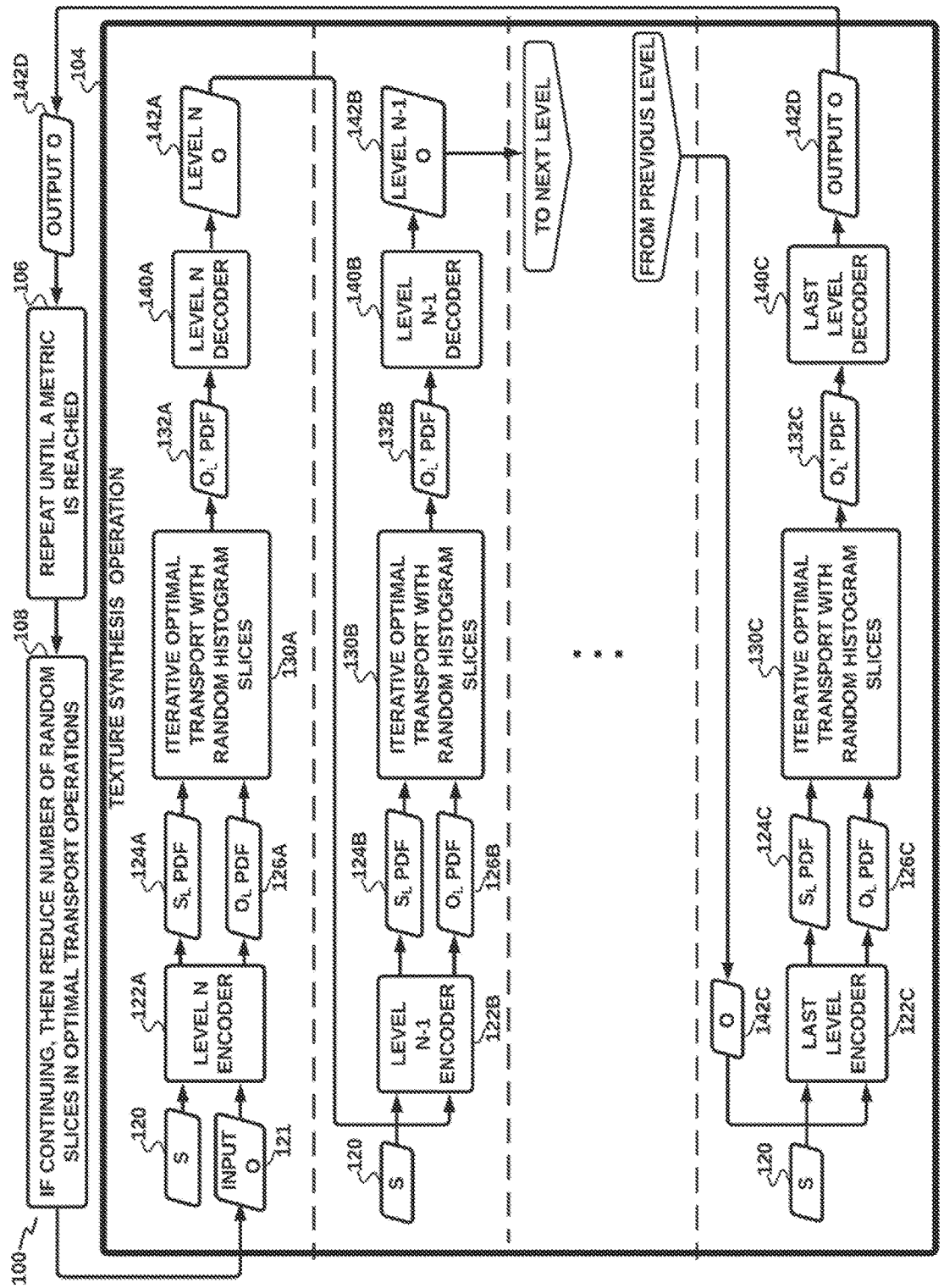
FIG. 1C is a schematic illustrating a data flow for a texture synthesis method, in accordance with an embodiment.
Figure 2:
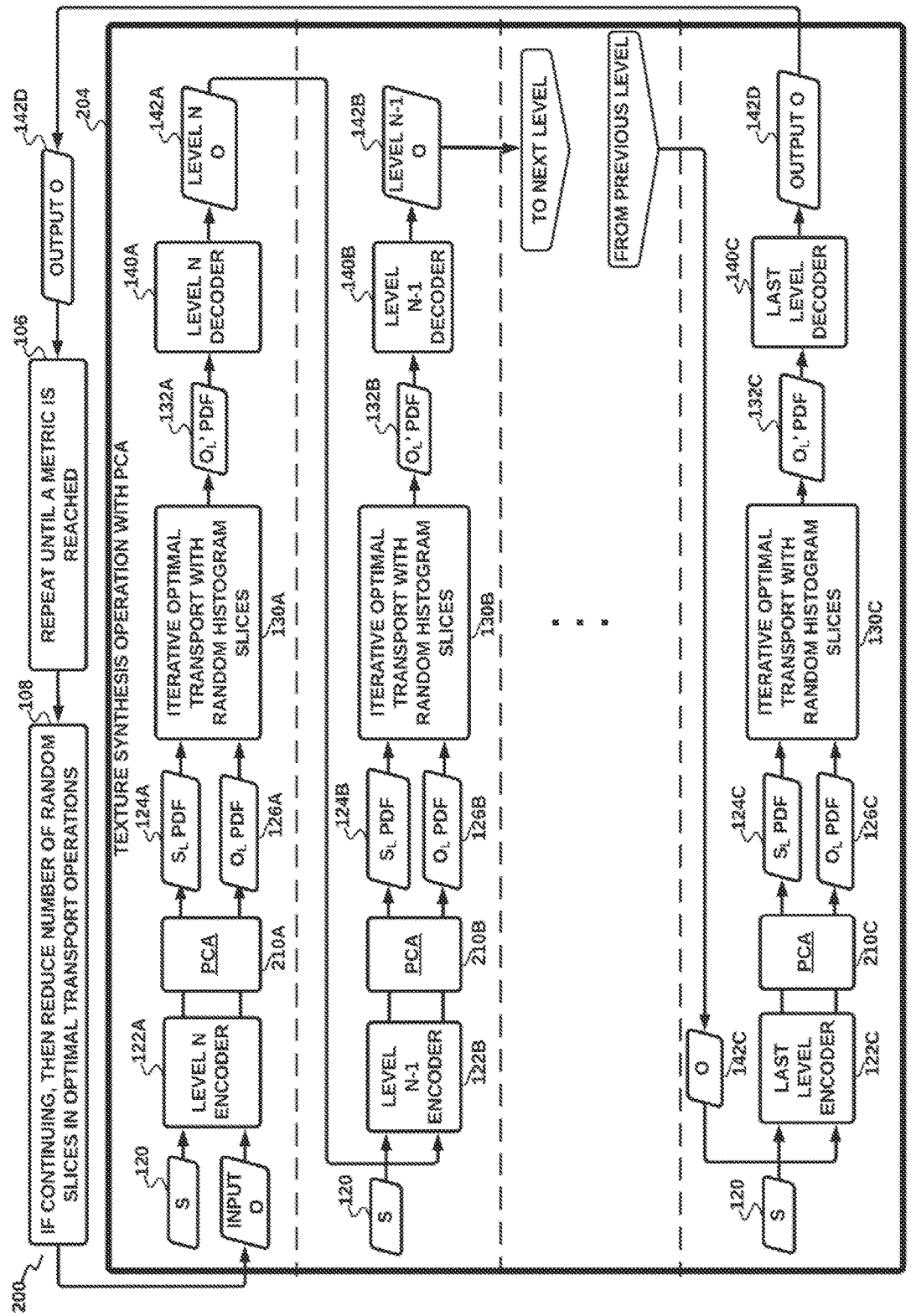
FIG. 2 is a schematic illustrating a data flow for a texture synthesis method with Principal Component Analysis (PCA), in accordance with an embodiment.

In accordance with an embodiment, the disclosure described herein presents a light-weight (e.g., computationally efficient), high-quality output texture synthesis system and method (e.g., as shown in FIG. 1A, FIG. 1B, and FIG. 1C) that generalizes to additional applications (e.g., including style transfer shown in FIG. 3, texture mixing shown in FIG. 4, and color transfer shown in FIG. 5, and as described below in a section describing extensions of the method to the additional applications). The texture synthesis system and method (e.g., shown in FIG. 1A, FIG. 1B, and FIG. 1C) utilizes an optimal transport optimization process within a bottleneck layer of an auto-encoder, (e.g., achieving quality and flexibility similar to computationally expensive back-propagation based neural texture synthesis methods), providing a computational efficiency that allows for real-time interactivity (e.g., with a human user). The bottleneck layer being a layer with fewer nodes (e.g., fewer neurons in a neural network) than a previous (or next) layer, and which generates a reduced dimension representation (e.g., feature representation) of an input. The disclosure described herein identifies that first order statistics used herein (e.g., as part of the methods shown in FIG. 1A, FIG. 1B, FIG. 1C, FIG. 2, FIG. 3, FIG. 4 and FIG. 5) may provide a more robust representation for textures when compared to second order statistics. The texture synthesis systems and methods described herein (e.g., shown in FIG. 1A, FIG. 1B, and FIG. 1C) may be configured to perform texture synthesis by including operations that perform optimal transport between a Probability Density Function (PDF) of deep neural activation vectors of an image (e.g., an image being synthesized), and an exemplar texture. In accordance with an embodiment, the texture synthesis systems and methods described herein includes a matching of random sliced 1-Dimensional histograms projected from a full N-Dimensional PDF distribution. In accordance with an embodiment, and as shown in FIG. 2, there is provided an extension of the texture synthesis method that includes a reduction in a dimensionality of a neural feature space (e.g., using principal component analysis). In accordance with an embodiment, the texture synthesis systems and methods (e.g., shown in FIG. 1A, FIG. 1B, and FIG. 1C) may include a multiscale coarse-to-fine synthesis pyramid to capture a large receptive field (e.g., as described in the method 100). In accordance with an embodiment, the texture synthesis systems and methods may also include a masking scheme that re-samples and reweights a feature distribution for a user guided texture painting and targeted style transfer (e.g., shown in FIG. 3). In example embodiments, the optimal transport process is the process T whose total cost is the least of all possible transport processes from M to F. In example embodiments, various cost functions may be used to measure the total cost, such as, for example, cost functions representing a cost in computing resources (e.g., processing power, memory, or bandwidth) of using the transport process.

Texture Synthesis

In accordance with an embodiment, and shown in FIG. 1A and FIG. 1B, is a texture synthesis method 100 describing a texture optimization process through an optimal transport based feature transformation within a bottleneck layer of a series of multi-scale auto-encoder loops. In accordance with an embodiment, and shown in FIG. 1C, is a data flow diagram of the texture synthesis method 100 showing details of a flow of data within the method 100. The description below references FIG. 1A, FIG. 1B, and FIG. 1C. In various embodiments, some of the method elements shown in FIG. 1A, FIG. 1B, and FIG. 1C may be performed concurrently, in a different order than shown, or may be omitted.

In accordance with an embodiment, and as shown in FIG. 1A, at operation 102 of the method 100 an input source texture is accessed, wherein the accessing includes receiving (e.g., from a user) and selecting (e.g., from a memory) the input source texture. In accordance with an embodiment, the input source texture may be the input source texture 'S' 120 shown in FIG. 1C, FIG. 2, and FIG. 3. The input source texture S 120 represents a desired texture, wherein a goal of the texture synthesis method 100 is to take the input source texture S 120 and synthesize a unique but visually similar output texture (e.g., output texture O 142D shown in FIG. 1C, FIG. 2, and FIG. 3). In order to generate the output texture O 142D, an initial input texture (e.g., initial input texture O 121 shown in FIG. 1C, FIG. 2, and FIG. 3) may be used as an initial estimate. In accordance with an embodiment, the initial input texture O 121 may be an image comprised of noise. In accordance with an embodiment, as part of operation 102, a number of levels for the texture synthesis method 100 is determined wherein each level includes a first nonlinear transform (e.g., such as an auto-encoder) that can operate on the input textures (e.g., the input source texture S 120 and the initial input texture O 121) in order to generate image features at different sizes and degrees of complexity. The determining of a number of levels may include using a pre-determined number of levels, receiving an input value for a number of levels (e.g., from a user via a user interface), and determining a number of levels based on a desired quality of the output texture O 142D. In accordance with an embodiment, for each of the determined levels, a second nonlinear transform (e.g., such as a decoder network) which may be symmetric (e.g., an inverse) to the first nonlinear transform is trained to invert feature space back into an original image space. Throughout the description herein the terms encoder and decoder are used to represent neural networks that are pre-trained for computer vision; however, it should be noted that other non-linear transformations can be substituted for the encoder/decoder without departing from the scope of the disclosure. In accordance with an embodiment, and shown in FIG. 1C, FIG. 2, and FIG. 3, the levels are separated in the figure by horizontal dashed lines and denoted in the data flow as 'Level N', 'Level N−1', . . . up to 'Last level'. In example embodiments, the first nonlinear transform may be an input neural network within an autoencoder, and the second nonlinear transform may be an output neural network in an autoencoder which form an input/output pair of the autoencoder neural network.

In accordance with an embodiment, at operation 104 of the method 100, the texture synthesis method is performed with the determined number of levels. Details of operation 104 are described with respect to FIG. 1B and FIG. 1C.

In accordance with an embodiment, at operation 106 of the method 100, after the number of levels are completed, an output (e.g., output texture O 142D shown in FIG. 1C) from operation 104 is tested against a metric that determines whether another round of texture synthesis is required (e.g., a determination as to whether another loop within operation 104 is required). In accordance with an embodiment, at operation 108 of the method 100, based on another round of texture synthesis being required (e.g., based on a result from operation 106), a number of random slices used as part of an optimal transport process within operation 104 is reduced and the method loops back to operation 104. In addition, based on a looping back, the input source texture S 120 is reused as the input source texture in operation 104, along with an output texture O 142D modified by operation 108 being used as a next initial input texture O 121.

In accordance with an embodiment, FIG. 1B and FIG. 1C show additional details of operation 104. In accordance with an embodiment, and shown in FIG. 1B, at operation 104A of operation 104, for each level (e.g., a level 'L') of the determined number of levels, the input source texture S 120 and an initial input texture O 121 is run through a first non-linear transformation (e.g., level N encoder 122A shown in FIG. 1C) which produces a resulting number of feature maps (e.g., N feature maps for neural network activations at a target level 'L'). The feature maps are denoted as $S_L$ and $O_L$ in FIG. 1C, FIG. 2, and FIG. 3, wherein 'L' denotes a level. As shown in in FIG. 1C, the first non-linear transformation 122A produces a probability distribution function (PDF) $S_L$ 124A from the input source texture S 120 and also produces a PDF $O_L$ 126A from the initial input texture O 121.

In accordance with an embodiment, as shown in FIG. 1B, at operation 104B of operation 104, for each level 'L' of the determined number of levels, the output PDFs of the first linear transform (e.g., PDF $S_L$ 124A and PDF $O_L$ 126A) are run through an optimal transport process 130A that includes random histogram slices. Given the pair of N dimensional feature distributions $S_L$ 124A and $O_L$ 126A, the optimal transport process 130A modifies activation values for $O_L$ 126A so that first order statistics associated with $O_L$ 126A match first order statistics of $S_L$ 124A before decoding the pair back into image space. The optimal transport process 130A may use a sliced histogram matching approach to perform the matching of the first order statistics. In accordance with an embodiment, the matching of first order statistics by the optimal transport process 130A is a feature transformation process that operates on a random orthogonal basis of the N-Dimensional space associated with $S_L$ 124A and $O_L$ 126A. In accordance with an embodiment, the performing of the feature transformation within the optimal transport process 130A on feature distributions $S_L$ 124A and $O_L$ 126A in an iterative loop across a plurality of random slices, allows for robust matching of feature interdependence between dimensions of the N-Dimensional space. An iterative loop reduction of feature distance through sliced histogram matching within the optimal transport process 130A provides a best-of-both-worlds solution between back-propagation methods and feed-forward methods, whereby it maintains a robust feature transformation associated with a back-propagation method while achieving an efficiency associated with a feed-forward method. In accordance with an embodiment, an accuracy of texture features being transferred to the output texture O 142D may be proportional to a quantity of slices within the plurality of random slices matched in the optimal transport processes (e.g., 130A, 130B and 130C).

In accordance with an embodiment, as shown in FIG. 1B, at operation 104C of operation 104, for each level 'L' of the determined number of levels, an output (e.g., output $O_L'$ 132A shown in FIG. 1C) from the optimal transport process 130A is sent through a second nonlinear transformation 140A wherein the second nonlinear transformation is a decoder, and may include an inverse transformation of the first nonlinear transformation 122A. For example, the decoder 140A may be configured to perform an inverse transformation of the first nonlinear transformation such that $S_L$ 124A would be transformed back to S 120 based on the configured decoder 140A receiving $S_L$ 124A as an input.

In accordance with an embodiment, as shown in FIG. 1B, at operation 104D of operation 104, an additional pair of nonlinear transformations are configured for a next lower level of the determined number of levels, wherein the additional pair of nonlinear transformations generate coarser features (e.g., coarser spatial features) as compared to a previous level (e.g., compared to a next higher level). For example, based on a type of the pair and additional pair of nonlinear transformations being an auto encoder, an internal number of neural network layers may be reduced during operation 104D for the additional pair of nonlinear transformations. In accordance with an embodiment, as part of operation 104D, the original input source texture S 120 and an output (e.g., level N O) 142A of the second transformation 140A is fed back into the next lower level (e.g., level N−1) wherein the next lower level uses the additional pair of nonlinear transformations (e.g., as shown in FIG. 1C). In accordance with an embodiment, the output texture O 142A from the first level is used as the input texture O for the next level nonlinear transformation 122B.

In accordance with an embodiment, and shown in FIG. 1C, a plurality of levels (e.g., the determined number of levels from operation 102) may be concatenated together wherein an output texture O (e.g., 142A and 142B) from a first level is used as an input texture O for a next level (e.g., a level below the first level) nonlinear transformation (122B and 122C). In accordance with an embodiment, each level of the determined number of levels would use the original texture input S 120 as an input.

Global Loop

An advantage of a back-propagation based image reconstruction method is its ability to optimize the image being generated towards multiple PDF targets in each iteration. Because operation 104 cycles through an encoder—feature transform—decoder for each level, optimal matches at coarse layers can drift from their ideal state as the process moves to shallow scales. This problem is mitigated with one or more additional global loops that run the entire process multiple times, which occurs in the method 100 as a loop between operations 104, 106, and 108. To keep an execution of the texture synthesis method 100 fast, a number of random slices (e.g., used in the optimal transport processes 130A, 130B, and 130C) can be reduced in each pass of the loop (e.g., operations 104, 106, and 108) so that a total number of slices are maintained over the entire method 100. The reduction of random slices achieves the same effect as keeping all layers optimized jointly within a back-propagation method. In practice, only a small number of global iterations are necessary to achieve good alignment between the levels (e.g., 3-6 loops depending on a speed/quality trade off as determined in operation 106).

PCA

In accordance with an embodiment, and shown in FIG. 2 is a method 200 that is a modification of the texture synthesis method 100, wherein the modification includes Principal Component Analysis (PCA) to lower a dimensionality of the feature subspace generated at the output of the first nonlinear transformation. Feature space (e.g., $S_L$ 124A, 124B, 124C, and $O_L$ 126A, 126B, and 126C) resulting from the nonlinear transformations (e.g., 122A, 122B, and 122C) in lower levels may become increasingly sparse. One interpretation of the sparseness at lower levels is that the representation for texture exists in a lower dimensional subspace of the nonlinear transformations. In accordance with an embodiment, the method shown in FIG. 2 exploits this characteristic to accelerate execution of the method 200 by performing optimal transport on a lower dimensional subspace identified through PCA, thus leading to an increase in computational efficiency. In accordance with an embodiment, as shown in FIG. 2, a PCA process (210A, 210B, and 210C) is applied to an output of the nonlinear transformation (e.g., 122A, 122B and 122C) for each level respectively. In accordance with an embodiment, the method 200 is similar to the method 100, and the operation 204 is similar to the operation 104 described in FIG. 1B and FIG. 1C, wherein at each level of the number of levels, an output of a first nonlinear transform is additionally passed through a PCA process. In accordance with an embodiment, the method 200 does not require any modifications to the optimal transport process (e.g., 130A, 130B, and 130C). In accordance with an embodiment, the PCA process (210A, 210B, and 210C) is carried out for texture/style features at the bottleneck layer of the auto-encoder and all network features are projected onto this basis. The PCA process (210A, 210B, and 210C) may determine a top N basis vectors of highest variance that cumulatively account for a predetermined amount (e.g., 90%) of total variance.

Extension to Other Applications:

Optimal transport offers an intuitive and principled framework for generalizing texture synthesis to the highly-related problems of style transfer and texture mixing/morphing. Within the optimal transport framework described in at least FIG. 1A, FIG. 1B, FIG. 1C, the problem of texture synthesis is one of synthesizing an image locally that exhibits the same global first order feature statistics of some exemplar texture image across the range of all meaningful spatial frequencies.

Extension to Style Transfer

Figure 3:
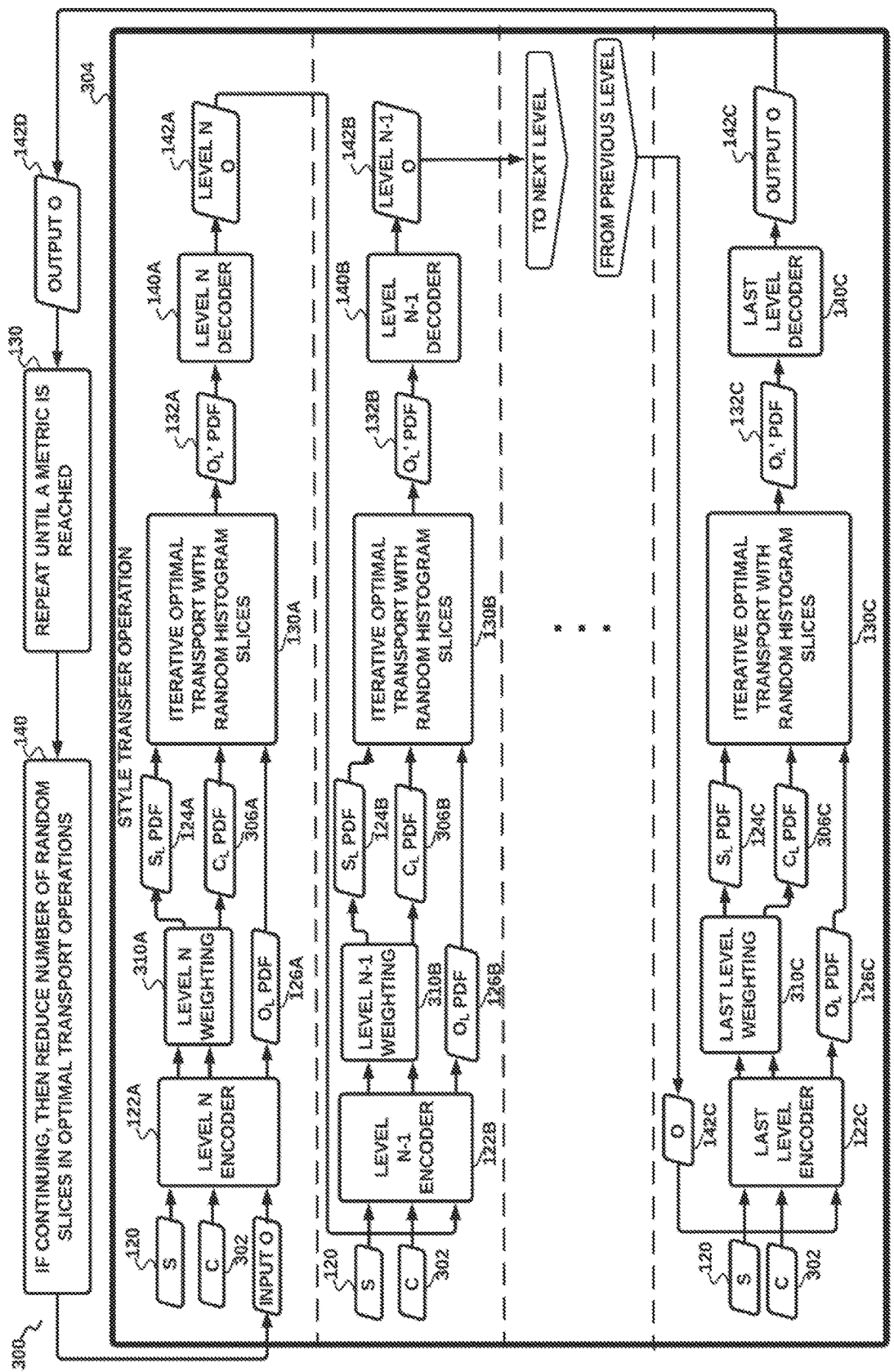
FIG. 3 is a schematic illustrating a data flow for a style transfer method, in accordance with an embodiment.

In accordance with an embodiment, and shown in FIG. 3 is a style transfer method 300 which is a modification of the texture synthesis method 100. The style transfer method 300 expands upon the texture synthesis method 100 (e.g., wherein operation 304 is similar to operation 104) by introducing a second exemplar image, a "content image" C 302 which is also matched during synthesis (e.g., within an iterative optimal transport process 130A, 130B, 130C, and the like), but which is weighted (e.g., via the weighting process 310A, 310B, and 310C) so the synthesis PDF favors the content image at coarser spatial frequencies while favoring the style/texture image S 120 at the finer spatial frequencies. In addition, the content PDF is matched within the optimal transport process (130A, 130B, and 130C) in a non-local way, wherein pixel coordinates target specific locations in feature space.

Optimal Transport through sliced histogram matching is uniquely well suited for high quality style transfer within a fast feed-forward approach due to its iterative nature. In accordance with an embodiment, and not shown in FIG. 3, before optimization within the optimal transport operation 130A (e.g., or 130B, or 130C), the PDF for content $C_L$ 306A (e.g., or 306B, or 306C) is aligned to the PDF for style $S_L$ 124A (e.g., or 124B, or 124C) by subtracting out a mean of $C_L$ 306A and adding a mean of $S_L$ 124A. In accordance with an embodiment, during optimization within operation 304 (e.g., within operation 130A, 130B, and 130C), each sliced histogram match is paired with a subsequent content match. In addition, during optimization (e.g., within operation 130A, 130B, and 130C), after each matching of slices operation and a subsequent de-projection operation, a content matching operation is performed that may update $O_L$ based on an input (e.g., from a user) that determines a degree of influence of the content image. For example, the input may be used with the equation $O_L = O_L + (C_L - O_L) \times$(contentStrength/sliceCount), wherein 'contentStrength' is a variable scalar (e.g., which may be user controllable) that determines a degree of influence that the content image C 302 has on the final output O 142D and 'sliceCount' is a value of a number of slices used.

The optimal transport process within operation 304 in FIG. 3 (130A, 130B, and 130C) is an optimization process, which provides a possibility of pairing a content match (e.g., via the introduction of the input content C 302) within each iteration of the style matching of the style transfer operation 304. This results in a style transfer method 300 wherein content and style features optimize together, rather than a "tug-of-war" behavior as seen within other approaches. This subtle but important distinction is a reason why the style transfer method 300 is able to achieve style transfer results akin to back-propagation methods, but using a fast feed-forward approach.

Extension to Texture Mixing

The goal of texture mixing is to interpolate and blend features of two or more textures. This can be used to create novel hybrid textures or to create complex transitions between different textures within a painting application. A naive interpolation of multiple distinct textures at the pixel level will lead to ghosting, seam and blurring artifacts and will not produce novel interpolations of texture features. In accordance with an embodiment, the method 400 shown in FIG. 4 solves the mixing problem in a way that is fast, works on a broad range of textures, is simple to implement, does not require custom training, and generates high quality results. The method 400 includes using optimal transport within a deep neural feature space as a method for achieving all these goals.

Figure 4:
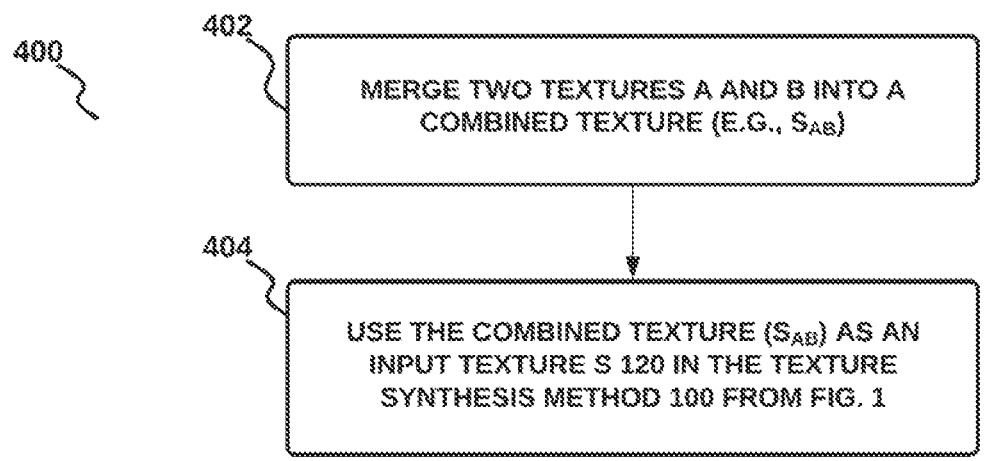
FIG. 4 is a schematic illustrating a method for texture mixing, in accordance with an embodiment.
Figure 5:
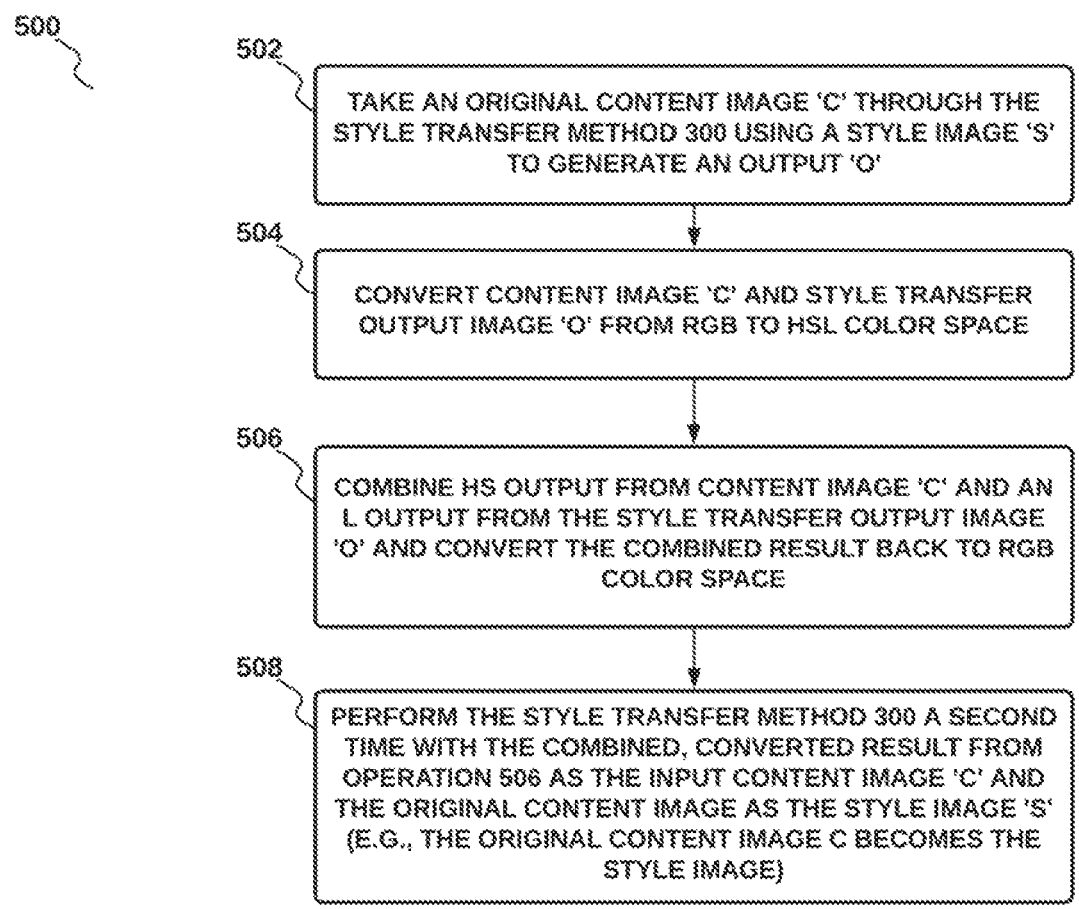
FIG. 5 is a schematic illustrating a method for color transfer, in accordance with an embodiment.

In accordance with an embodiment, and shown in FIG. 4 is a method for mixing two textures for use in the texture synthesis method 100 (e.g., which can then be used in the style transfer method 400 and the color method 500 shown in FIG. 5). In accordance with an embodiment, at operation 402 of the method 400, there is a mixing of a first texture 'A' and a second texture 'B' through an interpolation of their associated first order statistics, yielding a "mixed" feature distribution (e.g., denoted as SAB) that may be used for the input texture image 'S' 120 in the texture synthesis method 100. In accordance with an embodiment, at operation 404 of the method, the combined texture is used as an input texture image S 120 in the texture synthesis method 100 shown in FIG. 1.

In accordance with an embodiment, as part of operation 402, creating the mixed texture SAB includes first computing an optimal transport mapping (e.g., using the method in operation 112) from A to B (e.g., referred to as $A_B$). Furthermore, to achieve uniform synthesis quality, a second optimal transport mapping from B to A (e.g., referred to as $B_A$) is also performed. In addition, a "mixing mask" that includes a random interpolation value 'i' (e.g., from 0 to 1) for each pixel is also generated, wherein the random interpolation may follow a uniform distribution across the image. In accordance with an embodiment, the two mappings ($A_B$ and $B_A$) are used to generate a mixed texture $S_{AB}$. In accordance with an embodiment, the mixed texture SAB may be generated using the following equation for each interpolation value 'i':

mix=[mixingMask−i]

$S_{AB} = [A \times (1-i) + A_B \times i] \times \text{mix} + [B_A \times (1-i) + B \times i] \times (1 - \text{mix})$ Mixing through the above method using optimal transport achieves state of the art results without a need for custom training. The method shown in FIG. 4 is able to achieve more accurate reproduction of the input textures and runs orders of magnitude faster than some existing methods.

Color

Some existing neural style transfer algorithms entangle color within a feature representation of an image, thus making a transfer of color style intrinsic to the algorithms, which can be limiting. In accordance with an embodiment, and shown in FIG. 5 is a method 500 that includes optimal transport as a unifying framework for two statistical models of color and CNN activations, combining color and feature under one model, manipulated with a single algorithm. The two statistical models include: (1) a basic histogram match of second order color statistics, explored as a separate process from the style transfer algorithm. (2) Luminance-only style transfer of grayscale images, where the original colors of the content image are directly copied into the final result.

In accordance with an embodiment, control over color is achieved by using three dimensional color values directly as a final probability density function that sits on top of the multi-scale auto-encoder stack. Relative to existing work, the optimal transport based color transfer method described in FIG. 5 achieves a more accurate mapping of content image colors to an output. In addition, the systems and methods described herein combine strengths of both existing direct color transfer methods and existing luminance based style transfer methods. Existing direct color transfer is a global operation that does not preserve local colors. Existing luminance based style transfer methods weaken an overall style transfer effect while dependencies between luminance and color channels are lost in the output. For example, the lost dependency of luminance and color channels is particularly apparent for styles that include prominent brushstrokes since colors do not necessarily align to stroke patterns. In accordance with an embodiment, and shown in FIG. 5 is a combined method 500 that utilizes both strategies within the unified framework, overcoming each of their respective limitations.

In accordance with an embodiment, as part of operation 502 of the method 500, an original content image is processed through the style transfer method 300 (e.g., including the external looping 350), wherein the original content image is used as the content image input 'C' 302 and a separate style image is used as the input style image 'S' 120. In accordance with an embodiment, at operation 504 of the method 500, both the original content image and a final output 'O' (e.g., output 'O' 122D) of the style transfer method 300 are converted from RGB to HSL color space. Accordingly, the original content image 'C' is converted and includes hue (H), saturation (S), and lightness (L) values. Similarly, the final output 'O' is also converted and includes hue (H), saturation (S), and lightness (L) values. In accordance with an embodiment, at operation 506, hue and saturation (HS) components from the original content image and a light (L) component from the final output 'O' are combined to create a new style transfer result referred to herein as the "luminance style transfer" result. In accordance with an embodiment, as part of operation 506, the combined luminance style transfer result is converted back into RGB color space, which is used for the remainder of the color transfer method 500. In accordance with an embodiment, at operation 508 of the method 500, a second style transfer process 300 is performed (e.g., including the external looping 350), wherein converted luminance style transfer result (e.g., the luminance style transfer result converted back into RGB) is used as the content image input 'C' 302 for the method 300, and the original input content image is used as the input style image 'S' 120 (e.g., because this image contains the color properties that we want transferred). Next we perform our full optimal transport algorithm that we have presented for style transfer but we use the three-channel RGB values of each image directly rather than activation values produced the nonlinear transformation process. The method 500 thus robustly transfers the global content image color statistics while also anchoring specific colors to local image regions.

Extension to User Controls

The utility of texture synthesis as an artistic tool is marked by how easily and intuitively a user can guide the process underlying the tool, and control the final output. In accordance with an embodiment, optimal transport can be guided simply by re-balancing and re-weighting the feature space statistics. In accordance with an embodiment, masks are provided that assign a texture ID to each pixel in the content and style images, and in addition, there are two modifications added to the texture synthesis method 100. First, the target PDF $O_L$ (e.g., 126A, 126B, AND 126C) must be re-balanced so that its feature histogram with respect to texture IDs matches the desired histogram for the content mask. This can be achieved by simply removing or duplicating samples from each histogram bin at random. During synthesis, $S_L$ (e.g., 124A, 124B, AND 124C) requires an additional processing step so that image regions with a given texture ID are more likely to map to similar texture ID regions of $O_L$ (e.g., 126A, 126B, AND 126C). Before the optimal transport operation (e.g., operation 130A, 130B, and 130C), re-weight the distribution for each content histogram bin so that the distributions mean matches the distribution mean of the corresponding bin in the target histogram. While this is a relatively loose constraint, it sufficiently biases the optimal transport operation so that features are anchored to the desired image locations while allowing for the transition areas between texture regions enough flexibility to map to their optimal region of the target PDF $O_L$ (e.g., 126A, 126B, AND 126C).

This section has highlighted the texture painting use case because it most directly illustrates the power of statistics re-balancing and re-weighting as a simple means of guiding the optimal transport process. It should be noted that this approach can and should also be used to guide the style transfer and texture mixing process as well. The results shown in this section use the full texture synthesis method 100 and style transfer method 300 with the content strength set to zero and the starting image set to noise.

Multiresolution Synthesis

For texture synthesis (e.g., method 100), style transfer (e.g., method 300) and mixing/morphing (e.g., method 400), we have found results are generally improved by a coarse-to-fine synthesis using image pyramids. Given both an exemplar image resolution and desired synthesis image resolution, an image pyramid is built by successively dividing the image widths and heights by a ratio of two until any image in the set falls below 256 pixels in either dimension. This ensures that the receptive field has sufficient coverage at the coarsest pyramid level in order to represent large structures in the feature space. The synthesis results of one pyramid level is upscaled to the resolution of the next pyramid level using a bicubic filter and further refined through repeating the full algorithm. In accordance with an embodiment, the course-to-fine synthesis includes seeding the texture synthesis method 100 with a first input O 121 comprising noise with a resolution of the lowest level of the pyramid, and then for subsequent pyramid levels, the initial input O 121 of the method 100 is seeded with the bicubic upscaled output of the previous complete level (e.g., O 142D). During the course-to-fine synthesis, the input S 120 is taken from the original texture image's pyramid to correspond with the current synthesis pyramid level (e.g., a corresponding resolution). The Coarse-to-fine image-pyramid synthesis strategy described here makes it possible to synthesize large and complex texturestyle features for images of a resolution necessary for real-world use.

Performance

We now discuss some advantages of our result. Our optimal transport approach addresses instabilities commonly observed in neural texture synthesis methods that utilize parametric texture models or other summary statistics, by ensuring that the full statistical distribution of the features are preserved. We compare the optimal transport optimization described herein to existing methods, and we find that our Optimal Transport approach outperforms existing methods in multiple ways:

1. Larger structured features in the texture/style are well represented by the first-order joint statistics of the full feature distribution.

2. Feature blending/smearing artifacts of existing techniques are significantly reduced by our approach due to the additional "slices" capturing a more detailed view of the feature distribution.

3. The Optimal Transport used herein is an optimization process, which presents the opportunity to pair a content match within each iteration of the style match method. This results in a style transfer method 300 where the content and style features optimize together, rather than a "tug-of-war" relationship proposed in existing techniques. This subtle but important distinction is why our approach is able to achieve style transfer results akin to expensive back-propagation methods, but using a fast feed-forward approach.

4. The optimal transport framework described herein unifies style and color, which is a known open problem.

5. Mixing textures produces a more homogeneous result with more convincing interpolations of individual features.

6. A simple re-balancing and re-weighting strategy allows users to guide both the texture synthesis and style transfer process.

In addition to improving image quality, the key benefit of our algorithm is speed. Running times for our method are as follows. We used a machine with four physical cores (Intel Core i5-6600k), with 3.5 GHz, 64 GB of RAM, and an Nvidia Quadro P6000 GPU with 24 GB of GPU RAM, running Ubuntu. For a single 1024×1024 image, our method takes 23 seconds utilizing PCA and 84 seconds without PCA. This is in contrast to the back-propagation based optimization methods that take minutes to tens of minutes respectively. Our approach used three pyramid levels. For style transfer we add a progressively weighted content matching at relu3 1, relu4 1 and relu5 1 which increases the running time by a negligible amount. These metrics were measured over 100 full image synthesis operations. We believe this run-time performance makes optimal transport an attractive candidate for an interactive artist tool, particularly when only sub-regions of the image are edited in real time. Our current implementation utilizes a mixture of CPU and GPU processing, incurring a large performance penalty when synchronizing memory. We believe that significant performance improvements could be achieved through a strict GPU implementation.

We show that directly matching feature statistics is the native problem formulation for Texture Synthesis and by doing so, we are able to use our Statistical Matching Layer to solve a wide range of Texture Synthesis based problems that were previously believed to require separate techniques or non-trivial extensions to the core algorithm. We propose a simple, well principled method that achieves unprecedented speed and quality for Texture Synthesis and it's many sub-fields: Style Transfer, Texture Mixing, Multi-scale Texture Synthesis, Inverse Texture Synthesis and In-Painting while also being easier to control by the user. We present N-Dimensional probability density function transformations through an iterative sliced histogram matching operation as the first universal and general purpose texture synthesis algorithm.

While illustrated in the block diagrams as groups of discrete components communicating with each other via distinct data signal connections, it will be understood by those skilled in the art that the various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. Such software may at least temporarily transform the general-purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 6:
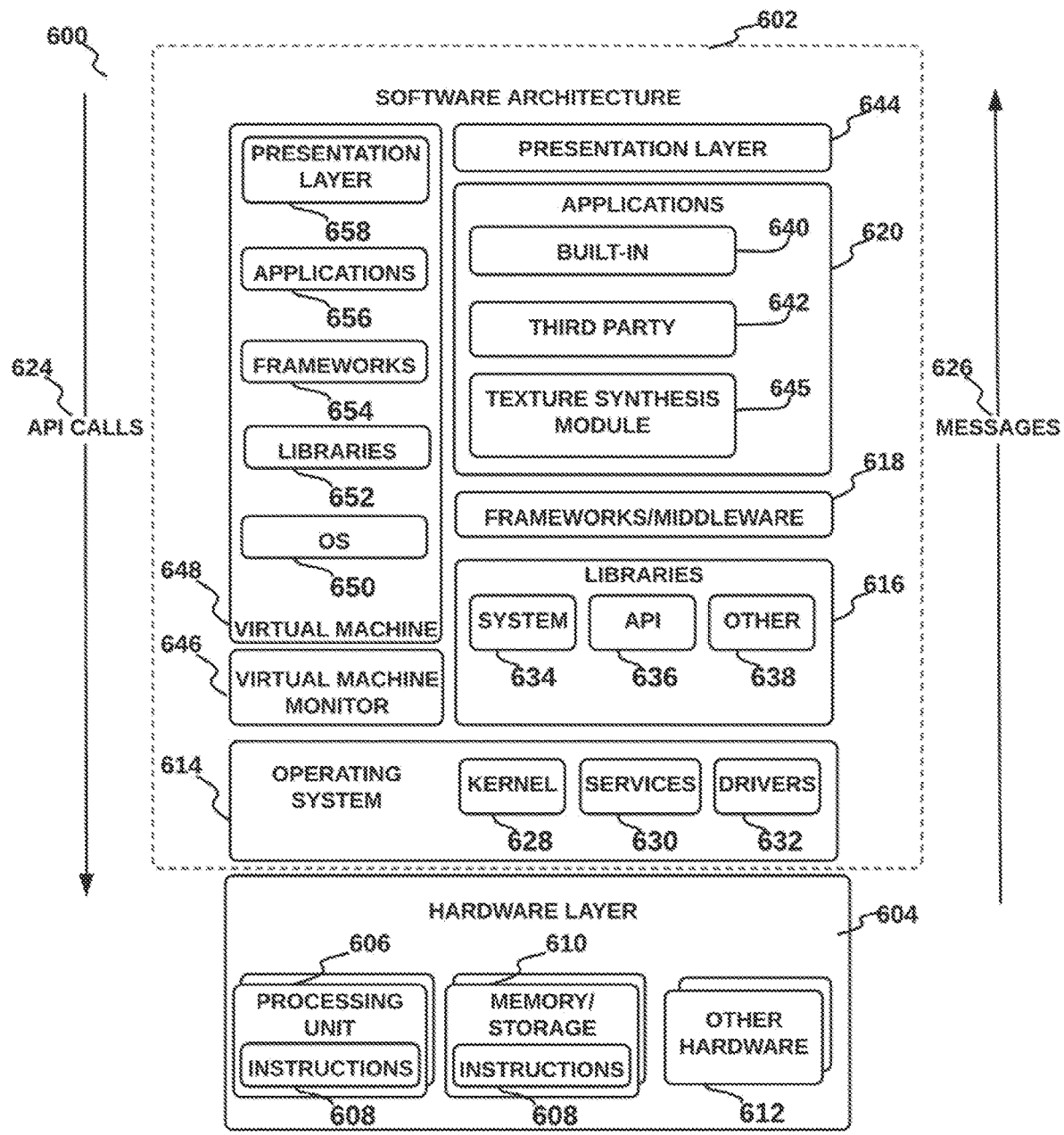
FIG. 6 is a block diagram illustrating an example software architecture, which may be used in conjunction with various hardware architectures described herein.

FIG. 6 is a block diagram 600 illustrating an example software architecture 602, which may be used in conjunction with various hardware architectures herein described to provide a gaming engine 601 and/or components of the texture synthesis system 100. FIG. 6 is a non-limiting example of a software architecture and it will be appreciated that many other architectures may be implemented to facilitate the functionality described herein. The software architecture 602 may execute on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 includes a processing unit 606 having associated executable instructions 608. The executable instructions 608 represent the executable instructions of the software architecture 602, including implementation of the methods, modules and so forth described herein. The hardware layer 604 also includes memory/storage 610, which also includes the executable instructions 608. The hardware layer 604 may also comprise other hardware 612.

In the example architecture of FIG. 6, the software architecture 602 may be conceptualized as a stack of layers where each layer provides particular functionality. For example, the software architecture 602 may include layers such as an operating system 614, libraries 616, frameworks or middleware 618, applications 620 and a presentation layer 644. Operationally, the applications 620 and/or other components within the layers may invoke application programming interface (API) calls 624 through the software stack and receive a response as messages 626. The layers illustrated are representative in nature and not all software architectures have all layers. For example, some mobile or special purpose operating systems may not provide the frameworks/middleware 618, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 616 may provide a common infrastructure that may be used by the applications 620 and/or other components and/or layers. The libraries 616 typically provide functionality that allows other software modules to perform tasks in an easier fashion than to interface directly with the underlying operating system 614 functionality (e.g., kernel 628, services 630 and/or drivers 632). The libraries 716 may include system libraries 634 (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The frameworks 618 (also sometimes referred to as middleware) provide a higher-level common infrastructure that may be used by the applications 620 and/or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 620 and/or other software components/modules, some of which may be specific to a particular operating system or platform.

The applications 620 include built-in applications 640 and/or third-party applications 642. Examples of representative built-in applications 640 may include, but are not limited to, a contacts application, a browser application, a book reader application, a location application, a media application, a messaging application, and/or a game application. Third-party applications 642 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 642 may invoke the API calls 624 provided by the mobile operating system such as operating system 614 to facilitate functionality described herein. The applications 620 include texture synthesis module 645, which may implement one or more of the operations described herein, such as one or more of the operations described with respect to FIG. 1A, 1B, 1C, 2, 3, 4, or 5.

The applications 620 may use built-in operating system functions (e.g., kernel 628, services 630 and/or drivers 632), libraries 616, or frameworks/middleware 618 to create user interfaces to interact with users of the system. Alternatively, or additionally, in some systems, interactions with a user may occur through a presentation layer, such as the presentation layer 644. In these systems, the application/module "logic" can be separated from the aspects of the application/module that interact with a user.

Some software architectures use virtual machines. In the example of FIG. 6, this is illustrated by a virtual machine 648. The virtual machine 648 creates a software environment where applications/modules can execute as if they were executing on a hardware machine (such as the machine 700 of FIG. 7, for example). The virtual machine 648 is hosted by a host operating system (e.g., operating system 614) and typically, although not always, has a virtual machine monitor 646, which manages the operation of the virtual machine 648 as well as the interface with the host operating system (i.e., operating system 614). A software architecture executes within the virtual machine 648 such as an operating system (OS) 650, libraries 652, frameworks 654, applications 656, and/or a presentation layer 658. These layers of software architecture executing within the virtual machine 648 can be the same as corresponding layers previously described or may be different.

Figure 7:
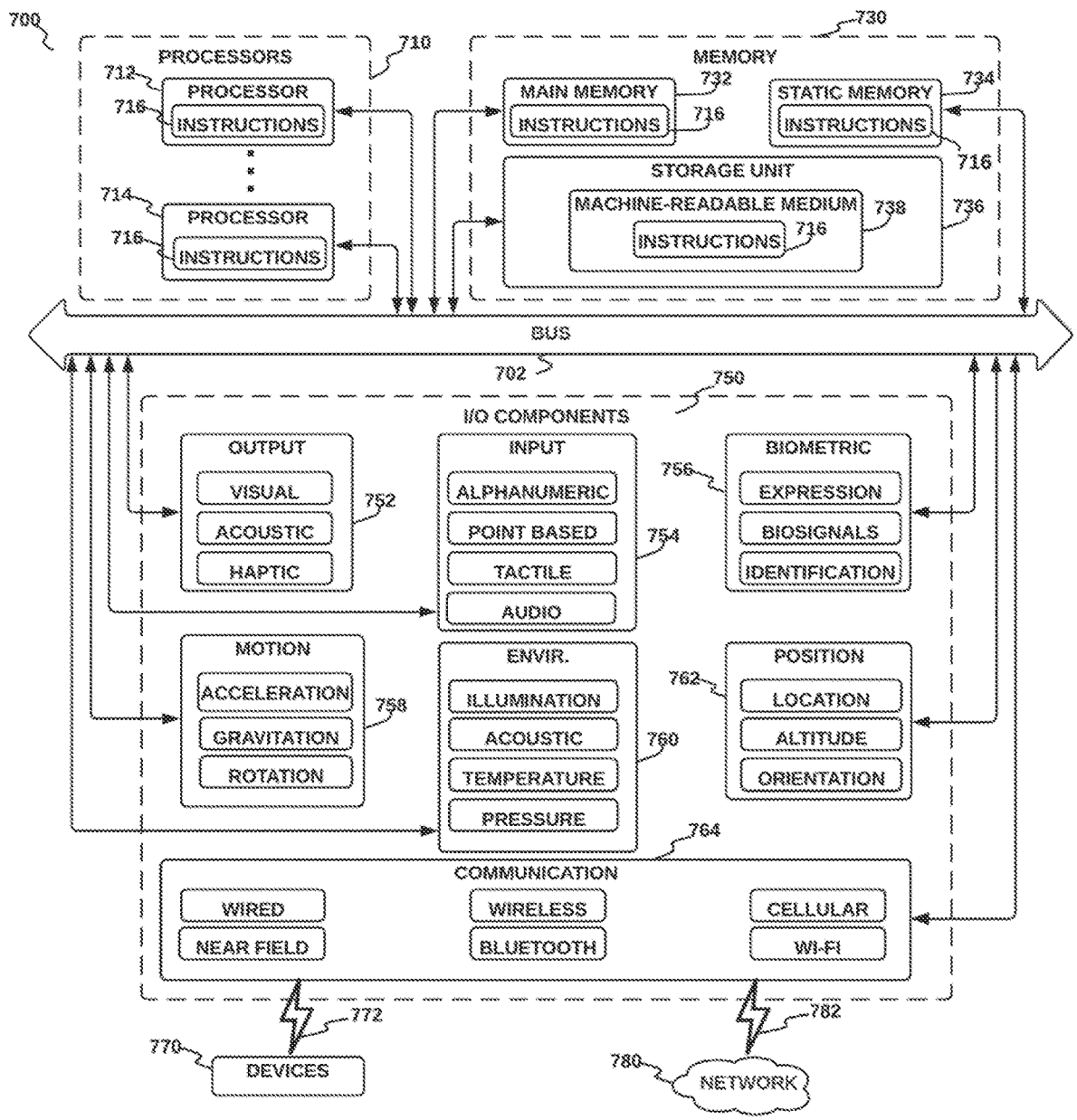
FIG. 7 is a block diagram illustrating components of a machine, according to some example embodiments, configured to read instructions from a machine-readable medium (e.g., a machine-readable storage medium) and perform any one or more of the methodologies discussed herein.

FIG. 7 is a block diagram illustrating components of a machine 700, according to some example embodiments, configured to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. As such, the instructions 716 may be used to implement modules or components described herein. The instructions transform the general, non-programmed machine into a particular machine programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines that individually or jointly execute the instructions 716 to perform any one or more of the methodologies discussed herein.

The machine 700 may include processors 710, memory 730, and input/output (I/O) components 750, which may be configured to communicate with each other such as via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 712 and a processor 714 that may execute the instructions 716. The term "processor" is intended to include multi-core processor that may comprise two or more independent processors (sometimes referred to as "cores") that may execute instructions contemporaneously. Although FIG. 7 shows multiple processors, the machine 700 may include a single processor with a single core, a single processor with multiple cores (e.g., a multi-core processor), multiple processors with a single core, multiple processors with multiples cores, or any combination thereof.

The memory/storage 730 may include a memory, such as a main memory 732, a static memory 734, or other memory, and a storage unit 736, both accessible to the processors 710 such as via the bus 702. The storage unit 736 and memory 732, 734 store the instructions 716 embodying any one or more of the methodologies or functions described herein. The instructions 716 may also reside, completely or partially, within the memory 732, 734, within the storage unit 736, within at least one of the processors 710 (e.g., within the processor's cache memory), or any suitable combination thereof, during execution thereof by the machine 700.

Accordingly, the memory 732, 734, the storage unit 736, and the memory of processors 710 are examples of machine-readable media 738.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine 700 (e.g., processors 710), cause the machine 700 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 750 may include a wide variety of components to receive input, provide output, produce output, transmit information, exchange information, capture measurements, and so on. The specific input/output (I/O) components 750 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 750 may include many other components that are not shown in FIG. 7. The input/output (I/O) components 750 are grouped according to functionality merely for simplifying the following discussion and the grouping is in no way limiting. In various example embodiments, the input/output (I/O) components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 750 may include communication components 764 operable to couple the machine 700 to a network 780 or devices 770 via a coupling 782 and a coupling 772 respectively. For example, the communication components 764 may include a network interface component or other suitable device to interface with the network 780. In further examples, the communication components 764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a Universal Serial Bus (USB)).

Moreover, the communication components 764 may detect identifiers or include components operable to detect identifiers. For example, the communication components 764 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 762, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

What is claimed is:

1. A system comprising:
one or more computer processors;
one or more computer memories;
a set of instructions stored in the one or more computer memories, the set of instructions configuring the one or more computer processors to perform operations, the operations comprising:
accessing data describing an input source texture and an initial input texture;
transforming the input source texture and the initial input texture into respective feature representations of each input, the transforming including using a first nonlinear transformation process;
applying an optimal transport process to the respective feature representations to modify a set of first order statistics, the set of first order statistics belonging to the initial input texture feature representation, the modifying including performing a matching of the set of first order statistics to a second set of first order statistics, the second set of first order statistics belonging to the input source texture feature representation; and
passing the modified set of first order statistics to a second nonlinear transform to convert the modified set of first order statistics into an image space.

2. The system of claim 1, wherein the first nonlinear transform and the second nonlinear transform are neural networks and form an input and output of an autoencoder neural network, respectively, and wherein the optimal transport process is applied on a bottleneck layer of the autoencoder.

3. The system of claim 1, wherein the operations further include:
configuring an additional first nonlinear transformation process and an additional second nonlinear transformation process in a lower level of texture synthesis, wherein the additional pair of nonlinear transformation processes generate coarser feature representations as compared to the first nonlinear transformation process and the second nonlinear transformation process; and
providing the input source texture and the output image as inputs to the additional first nonlinear transformation process.

4. The system of claim 2, wherein feature representations from the first nonlinear transform include a probability density function of deep neural network activation vectors of an input to the first nonlinear transform.

5. The system of claim 4, wherein the optimal transport process matches random sliced 1-dimensional histograms projected from the probability density function.

6. The system of claim 5, wherein the operations further include:
determining an additional texture synthesis is required based on a metric applied to the output;
reducing a number of the random sliced 1-dimensional histograms; and
using the output as a new initial input texture.

7. The system of claim 1, wherein the operations include:
accessing a content image for use as an additional input source texture; and
weighting the content image prior to applying the optimal transport process to favor the content image at coarse spatial frequencies and favor the input source texture at finer spatial frequencies.

8. The system of claim 1, wherein the operations further include:
determining a lower dimensional subspace for the respective feature representations using principal component analysis; and
applying the optimal transport process on the lower dimensional subspace.

9. A non-transitory computer-readable storage medium storing a set of instructions that, when executed by one or more computer processors, causes the one or more computer processors to perform operations, the operations comprising:
accessing data describing an input source texture and an initial input texture;
transforming the input source texture and the initial input texture into respective feature representations of each input, the transforming including using a first nonlinear transformation process;
applying an optimal transport process to the respective feature representations to modify a set of first order statistics, the set of first order statistics belonging to the initial input texture feature representation, the modifying including performing a matching of the set of first order statistics to a second set of first order statistics, the second set of first order statistics belonging to the input source texture feature representation; and
passing the modified set of first order statistics to a second nonlinear transform to convert the modified set of first order statistics into an image space.

10. The non-transitory computer-readable storage medium of claim 9, wherein the first nonlinear transform and the second nonlinear transform are neural networks and form an input and output of an autoencoder neural network, respectively, and wherein the optimal transport process is applied on a bottleneck layer of the autoencoder.

11. The non-transitory computer-readable storage medium of claim 9, wherein the operations further include:
configuring an additional first nonlinear transformation process and an additional second nonlinear transformation process in a lower level of texture synthesis, wherein the additional pair of nonlinear transformation processes generate coarser feature representations as compared to the first nonlinear transformation process and the second nonlinear transformation process; and
providing the input source texture and the output image as inputs to the additional first nonlinear transformation process.

12. The non-transitory computer-readable storage medium of claim 10, wherein feature representations from the first nonlinear transform include a probability density function of deep neural network activation vectors of an input to the first nonlinear transform.

13. The non-transitory computer-readable storage medium of claim 12, wherein the optimal transport process matches random sliced 1-dimensional histograms projected from the probability density function.

14. The non-transitory computer-readable storage medium of claim 13, wherein the operations further include:
determining an additional texture synthesis is required based on a metric applied to the output;
reducing a number of the random sliced 1-dimensional histograms; and
using the output as a new initial input texture.

15. The non-transitory computer-readable storage medium of claim 9, wherein the operations include:
accessing a content image for use as an additional input source texture; and
weighting the content image prior to applying the optimal transport process to favor the content image at coarse spatial frequencies and favor the input source texture at finer spatial frequencies.

16. The non-transitory computer-readable storage medium of claim 9, wherein the operations further include:
determining a lower dimensional subspace for the respective feature representations using principal component analysis; and
applying the optimal transport process on the lower dimensional subspace.

17. A method comprising:
accessing data describing an input source texture and an initial input texture;
transforming the input source texture and the initial input texture into respective feature representations of each input, the transforming including using a first nonlinear transformation process;
applying an optimal transport process to the respective feature representations to modify a set of first order statistics, the set of first order statistics belonging to the initial input texture feature representation, the modifying including performing a matching of the set of first order statistics to a second set of first order statistics, the second set of first order statistics belonging to the input source texture feature representation; and
passing the modified set of first order statistics to a second nonlinear transform to convert the modified set of first order statistics into an image space.

18. The method of claim 17, wherein the first nonlinear transform and the second nonlinear transform are neural networks and form an input and output of an autoencoder neural network, respectively, and wherein the optimal transport process is applied on a bottleneck layer of the autoencoder.

19. The method of claim 17, wherein the operations further include:
configuring an additional first nonlinear transformation process and an additional second nonlinear transformation process in a lower level of texture synthesis, wherein the additional pair of nonlinear transformation processes generate coarser feature representations as compared to the first nonlinear transformation process and the second nonlinear transformation process; and
providing the input source texture and the output image as inputs to the additional first nonlinear transformation process.

20. The method of claim 18, wherein feature representations from the first nonlinear transform include a probability density function of deep neural network activation vectors of an input to the first nonlinear transform.

* * * * *